March 31, 1931.                V. HAIGH                1,798,530
GEAR CONTROL LEVER MOUNTING
Filed July 29, 1929
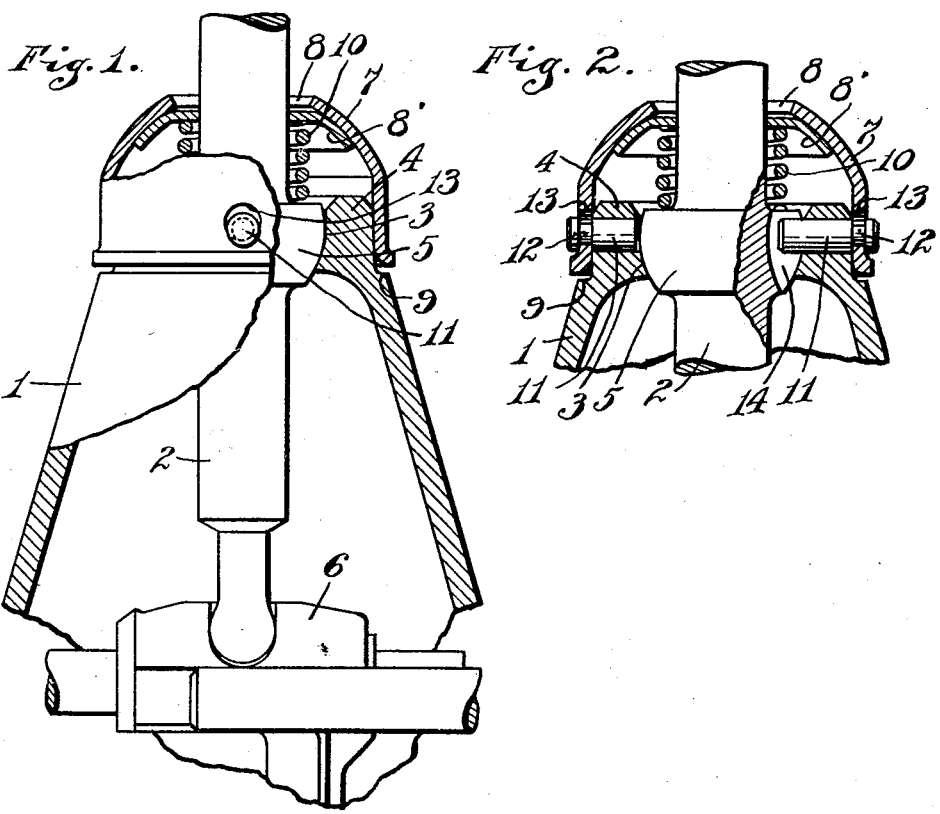
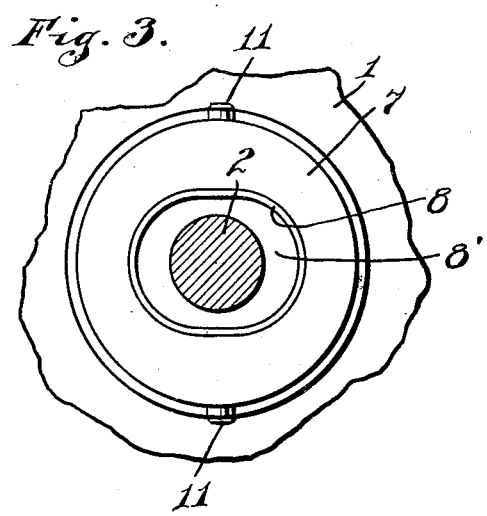
INVENTOR.
Vaughn Haigh,
BY
Hood + Hahn.
ATTORNEYS Patented Mar. 31, 1931

1,798,530

UNITED STATES PATENT OFFICE

VAUGHN HAIGH, OF MUNCIE, INDIANA, ASSIGNOR TO WARNER GEAR COMPANY, OF MUNCIE, INDIANA, A CORPORATION OF INDIANA

GEAR-CONTROL-LEVER MOUNTING

Application filed July 29, 1929. Serial No. 382,032.

My invention relates to improvements in the means for mounting the shifter levers of automobile transmissions.

One of the objects of my invention is to provide a mounting for such shifter levers which will permit the ready removal of the lever without disassembling the transmission housing and without removing from the transmission housing the support pedestal in which the shifter lever is mounted.

For the purpose of disclosing my invention, I have illustrated one embodiment thereof in the accompanying drawing, in which:

Fig. 1 is a sectional view of a pedestal support for the shift lever;

Fig. 2 is a detailed sectional view of the shift lever mounting and

Fig. 3 is a plan view of the supporting pedestal.

In the embodiment illustrated, the supporting pedestal 1, in which the shift lever 2 is adapted to be mounted, is provided at its upper end with an opening through which the shift lever extends.

This opening is surrounded by a semi-spherical recess 3 formed in the top 4 of the pedestal and which is concave having its greatest diameter in the top of the pedestal. The shift lever 2 is provided with an annular semi-spherical shoulder 5 which rests in this concave semi-spherical recess 3 and supports the lever, the lower end of which is adapted to engage in the slots of the shifting forks 6. Covering the top of the pedestal is a semi-spherical cap 7 having an enlarged central opening 8 through which the lever is adapted to project. The side walls of this cap fit over the upper end of the pedestal 1 and in order to prevent the rocking of the cap, when it is in position, an annular shoulder 9 is formed on the pedestal immediately beneath the cap. Within the cap 7 and closing the opening 8, is a substantially concavo-convex washer 8' which surrounds the lever 2, and interposed between this washer and the shoulder 5 is a coiled spring 10. The cap is held in position and against the lifting influence of the coiled spring 10 by means of a pair of restraining pins 11 disposed in diametrically opposed position and adapted to be inserted in openings in the top of the pedestal. Each of these pins is provided an anular groove 12 near its outer end and the cap, in its side walls, is provided with apertures 13 through which the pins project. After the pins have been inserted in position, due to the influence of the coiled spring 10, the cap is biased upwardly thereby causing the walls of the openings to engage in the anular grooves in the pins, thus preventing the casual displacement of these pins and at the same time maintaining the cap in position. A slot 14 is provided in the semi-spherical shoulder 5 which is adapted to receive the end of one of the pins, the pin being made long for this purpose, to prevent rotative turning of the lever.

I claim as my invention:

1. The combination with a hollow open ended pedestal having a concave semi-spherical recess surrounding the opening therein, a tiltable lever adapted to pass through said opening having a semi-spherical shoulder seating in said recess, a semi-spherical cap fitting over the end of said pedestal having an opening in its top through which said lever passes, a convex washer sleeved on said lever and closing said cap opening, a coiled spring interposed between said washer and the shoulder on said lever, and pins removably secured in said pedestal having annular grooves therein, said cap having openings in the side walls thereof through which said pins project and the coiled spring exerting a force to maintain the walls of the openings in said grooves to prevent the displacement of the pins.

2. The combination with a hollow open ended pedestal having a concave semi-spherical recess surrounding the opening therein, a tiltable lever adapted to be passed through said opening having a semi-spherical shoulder seating in said recess, a semi-spherical cap fitting over the end of said pedestal having an opening in its top through which said lever passes, a convex washer surrounding said lever and closing said opening, a coiled spring interposed between said washer and said shoulder on the lever, pins removably secured in the pedestal having annular grooves therein, said cap having openings in the side walls thereof through which said pins project, the coiled spring exerting a force to maintain the walls in said opening of said groove to prevent the dispacement of the pins, and one of said pins being adapted to engage in a slot in the lever to prevent rotation of the lever.

3. The combination with a hollow ended pedestal having a semi-spherical recess surrounding the opening therein, a tiltable lever passing through said opening and having a semi-spherical shoulder seated in said recesses, a semi-spherical cap fitting over the end of said pedestal, a coiled spring surrounding said lever and exerting a pressure against said cap, and pins removably secured in said pedestal having annular grooves therein, said cap having openings in the side walls thereof through which said pins project said coiled spring exerting a force to maintain the walls of said openings in said grooves to prevent displacement of the pins.

4. The combination with a hollow open ended pedestal having a concave semi-spherical recess surrounding the opening therein, a tiltable lever passing through said opening having a semi-spherical shoulder seated in said recess, a cap fitting over the end of said pedestal, a coiled spring interposed between said cap and said shoulder, pins removably secured in said pedestal and having a mechanical interlock with said cap, said spring exerting a pressure to maintain said cap in its mechanical interlocked connection with said pins.

In witness whereof, I, VAUGHN HAIGH, have hereunto set my hand at Muncie, Indiana, this 9th day of July, A. D. one thousand nine hundred and twenty-nine.

VAUGHN HAIGH.